J. P. FITCH.
Churn.
No. 26,841.  Patented Jan'y 17, 1860.
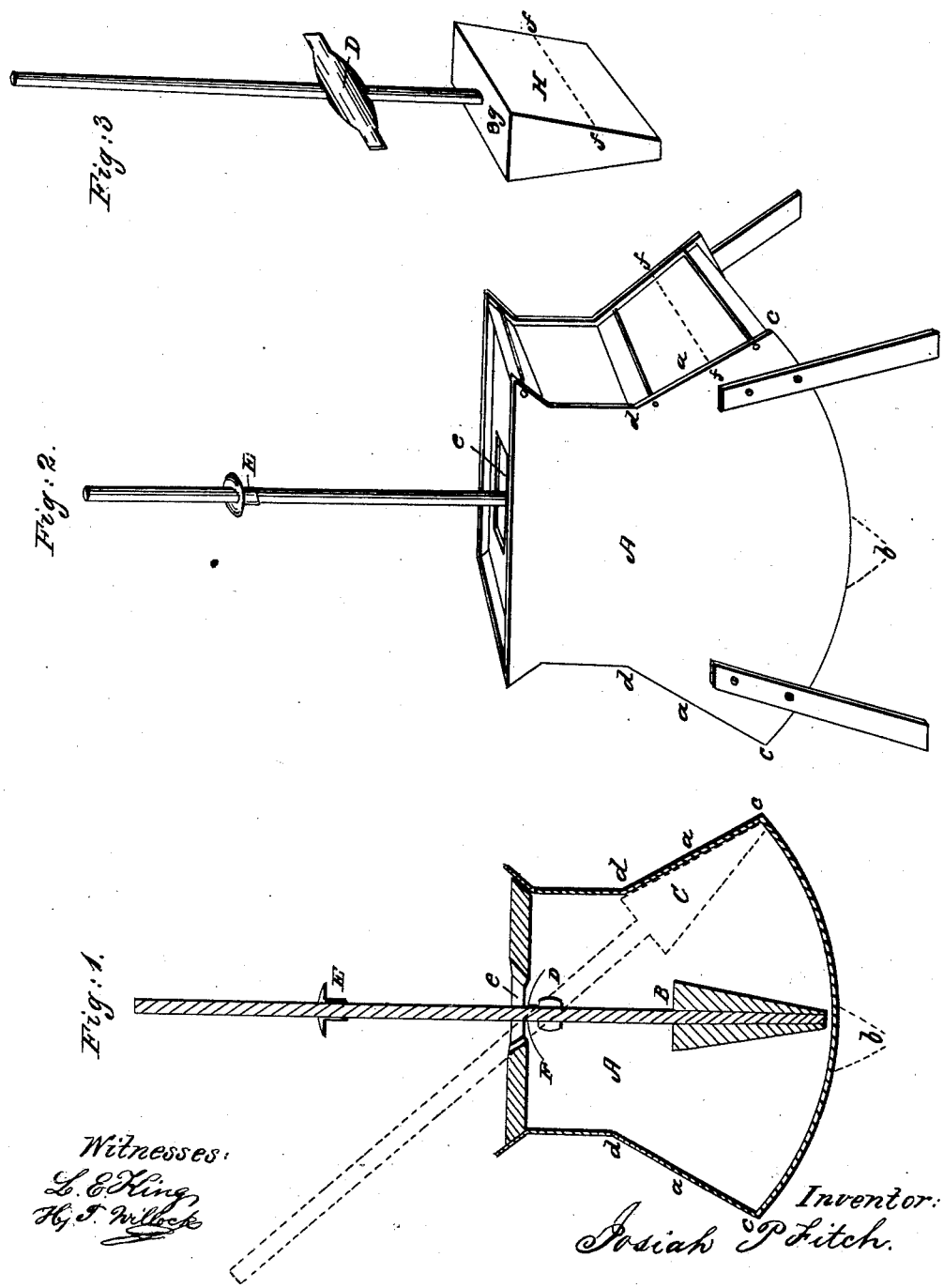

UNITED STATES PATENT OFFICE.

JOSIAH P. FITCH, OF NEW YORK, N. Y.

CHURN.

Specification of Letters Patent No. 26,841, dated January 17, 1860.

*To all whom it may concern:*

Be it known that I, JOSIAH P. FITCH, of the city, county, and State of New York, have invented a new and useful Improvement in Churns; and I do hereby declare that the following is a full, clear, and exact description of the same, reference being had to the accompanying drawings, forming a part of this specification, in which—

Figure 1, is a vertical longitudinal section of a churn made after my invention. Fig. 2, is a perspective view of the same, and Fig. 3, is a perspective view of the dasher.

Similar letters of reference, in each of the several figures indicate corresponding parts.

The nature of my invention consists in providing a circular guard on the dasher staff just above the axis on which it swings, so that no cream shall be allowed a chance to get up into the space in which the dasher swings and thus all the inconvenience of cream being churned at this point and after becoming spoiled by heat and dirt running down and mixing with the pure cream.

It consists, second, in arranging a hand rest on the handle so that it may be adjusted to suit the height of different persons. This arrangement prevents a slipping down of the hand which operates the churn and thus renders the churning more convenient.

To enable others, skilled in the art, to make and use my invention, I will proceed to describe its construction and operation.

A, represents the churn tub. Its bottom *b*, is curved and its ends *a*, *a*, are partly inclined and partly vertical.

B, is the dasher, made either solid or hollow and of a shape similar to a truncated wedge; it is hung on a swinging crosshead D, so that it just sweeps the circular bottom of the tub and strikes the inclined portion of the ends of the tub squarely, as illustrated by dotted lines in Fig. 1, in its back and forward movements. If the dasher is made hollow, hot water may be introduced into it through the opening *g*, and the temperature of the cream thus regulated.

F, is a circular guard placed on the handle of the dasher just above the cross head D, and below the cover of the tub, so as to close the hole *e*, in which the dasher staff plays, and yet not interfere with the movement of the dasher. This guard moves with the dasher and prevents the escape of the cream up through the opening *e*, while it is being agitated. It is also so situated that no cream can get up between it and the underside of the churn cover and therefore the liability of cream being churned at this point and after becoming impure or dirty running down and mixing with the pure cream in the tub, is avoided.

E, is a hand rest on the dasher staff. This rest is adjustable by means of a set screw on the shaft, so that it can be raised or lowered to suit persons of different heights.

The operation is as follows: The churn tub being partly filled with cream, the dasher is moved back and forth. This operation causes the cream to be compressed between the inclined portions of the ends of the tub and the taper sides of the dasher and also to be kept in circulation, for as it is impossible for it to run back under the bottom of the dasher, it necessarily rises and falls over the top of the same back into the center of the tub.

From the foregoing description, it will be seen that with an exceedingly simple arrangement, the cream is subjected to the two actions necessary to speedily convert it into butter, to wit; compression and agitation.

What I claim as my invention and desire to secure by Letters Patent, is—

1. The curved guard F, arranged on the dasher staff and moving with the same, in combination with the peculiar shaped dasher and churn tub, in the manner and for the purposes described.

2. The hand rest E, when made adjustable, in combination with the guard D, churn tub A, and dasher B, in the manner described.

JOSIAH P. FITCH.

Witnesses:
L. E. KING,
HY. T. WILLOCK.